US009903508B2

(12) United States Patent
Chappel

(10) Patent No.: US 9,903,508 B2
(45) Date of Patent: Feb. 27, 2018

(54) MICROFLUIDIC VALVE HAVING IMPROVED TOLERANCE TO PARTICLES

(71) Applicant: DEBIOTECH S.A., Lausanne (CH)

(72) Inventor: Eric Chappel, Versonnex (FR)

(73) Assignee: DEBIOTECH S.A., Lausanne (CH)

( * ) Notice: Subject to any disclaimer, the term of this patent is extended or adjusted under 35 U.S.C. 154(b) by 24 days.

(21) Appl. No.: 14/773,438

(22) PCT Filed: Mar. 7, 2014

(86) PCT No.: PCT/IB2014/059519
§ 371 (c)(1),
(2) Date: Sep. 8, 2015

(87) PCT Pub. No.: WO2014/136090
PCT Pub. Date: Sep. 12, 2014

(65) Prior Publication Data
US 2016/0018021 A1    Jan. 21, 2016

(30) Foreign Application Priority Data
Mar. 7, 2013 (EP) ..................... 13158177

(51) Int. Cl.
*F16K 99/00* (2006.01)
*F16K 1/44* (2006.01)

(52) U.S. Cl.
CPC .......... *F16K 99/0005* (2013.01); *F16K 1/443* (2013.01); *F16K 2099/0094* (2013.01)

(58) Field of Classification Search
CPC ............. F16K 99/0001; F16K 99/0005; F16K 99/0015; F16K 2099/0094; F04B 43/02; F04B 43/021
USPC ...................... 251/129.06, 331; 137/852, 854
See application file for complete search history.

(56) References Cited

U.S. PATENT DOCUMENTS

| 5,535,937 A | 7/1996 | Boiarski et al. |
| 5,759,014 A | 6/1998 | Van Lintel |
| 6,334,761 B1 | 1/2002 | Tai et al. |
| 6,715,733 B2 * | 4/2004 | Wang ........................ F15C 5/00 137/859 |
| 6,986,365 B2 * | 1/2006 | Henning .................... F15C 5/00 137/625.28 |
| 7,159,841 B2 * | 1/2007 | Gemmen ................... F15C 5/00 251/129.06 |

(Continued)

FOREIGN PATENT DOCUMENTS

| EP | 1 283 957 | 2/2003 |
| WO | WO 91/01464 | 2/1991 |
| WO | WO 2010/046728 | 4/2010 |

OTHER PUBLICATIONS

International Search Report for PCT/IB2014/059519, dated Jul. 22, 2014, six pages.
Written Opinion for PCT/IB2014/059519, dated Jul. 22, 2014, six pages.
Chen, Po-Jui, et al., "Floating-Disk Parylene Microvalve for Self-Regulating Biomedical Flow Controls," IEEE 21st International Conference on Micro Electro Mechanical Systems, 2008, pp. 575-578, XP31210811.

(Continued)

*Primary Examiner* — Ian Paquette
(74) *Attorney, Agent, or Firm* — Nixon & Vanderhye P.C.

(57) ABSTRACT

The present invention describes a valve for controlling the passage of a microfluidic system. Said valve comprises a first valve element (103) and a second valve element (104, 105) with respective first and second contact surfaces which are placed opposite to each other in such a way as to control a fluid flow through said passage. Said first valve element comprising a flexible part and a rigid part.

22 Claims, 7 Drawing Sheets

(56) References Cited

U.S. PATENT DOCUMENTS

| | | | |
|---|---|---|---|
| 7,474,180 B2* | 1/2009 | Bintoro | F15C 5/00 200/181 |
| 7,594,314 B2* | 9/2009 | Burger | B01L 3/502707 156/153 |
| 8,499,794 B2* | 8/2013 | Takahashi | B01J 19/0093 137/829 |
| 2002/0139953 A1 | 10/2002 | Hagiwara et al. | |
| 2003/0071235 A1 | 4/2003 | Gamble et al. | |
| 2005/0023500 A1 | 2/2005 | Kerger | |
| 2006/0027523 A1 | 2/2006 | Van Lintel et al. | |
| 2008/0163932 A1* | 7/2008 | Cottom | B60T 15/52 137/102 |
| 2013/0271538 A1* | 10/2013 | Boyd | F16K 17/14 347/86 |

OTHER PUBLICATIONS

White, J., et al., "An instrument to control parallel plate separation for nanoscale flow control," Review of Scientific Instruments, vol. 74, No. 11, Nov. 2003, pp. 4869-4875, XP12060670.

Yang, Eui-Hyeok (EH), et al., "Leak-Tight Piezoelectric Microvalve for High-Pressure Gas Micropropulsion," Journal of Microelectromechanical Systems, vol. 13, No. 5, Oct. 2004, pp. 799-807, XP11119858.

European Search Report dated Aug. 15, 2013, issued in European Patent Application No. 13158177.

Written Opinion dated Aug. 15, 2013, issued in European Patent Application No. 13158177.9.

* cited by examiner

MICROFLUIDIC VALVE HAVING IMPROVED TOLERANCE TO PARTICLES

This application is the U.S. national phase of International Application No. PCT/IB2014/059519 filed 7 Mar. 2014 which designated the U.S. and claims priority to EP Patent Application No. 13158177.9 filed 7 Mar. 2013, the entire contents of each of which are hereby incorporated by reference.

FIELD OF INVENTION

The present invention is related to valves as used in MEMS micro-pumps or used in diverse devices.

STATE OF THE ART

In the prior art, there are several types of micro valves that can be used for the control of flow within microfluidic systems. The fabrication of most of these valves is achieved using silicon micromachining technology.

Figure 1:
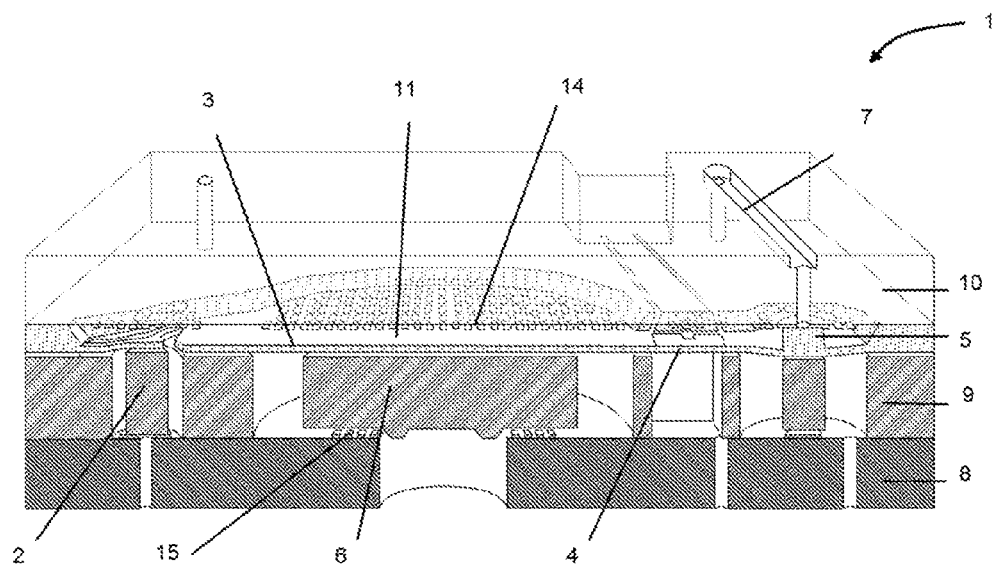

These valves (also called micro valves) are encountered, for example but not exclusively, in micro-pumps for medical use. Said micro-pumps permit to deliver a regular and controlled quantity of medication. The manufacturing of micro-pumps may be based on silicon micromachining technologies and of the use of a piezoelectric actuator. For example, a micro-pump, as shown in FIG. 1, is described by the patent publication US 2006/027523. In such micro-pump (1), it is necessary to make an inlet valve and sometimes an outlet valve so that the leak rate is minimized and ideally equal to zero. The leak rate of a valve corresponds to the rate at which a liquid flows through the valve when the valve is closed.

Figure 2:
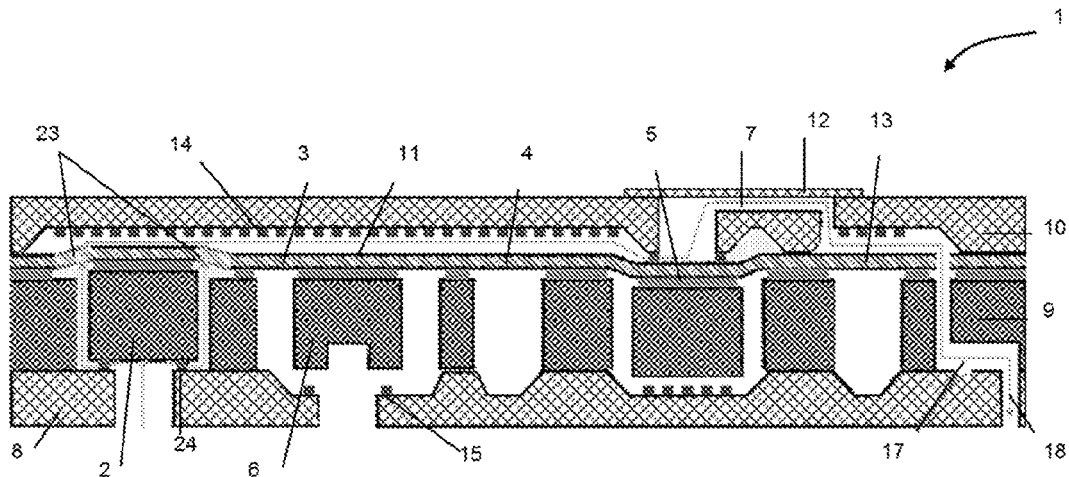

The FIG. 2 illustrates a cross-section showing said micro-pump (1) which includes an inlet valve (2) located near the inlet port which is connected to the reservoir, a pumping chamber (11), an outlet valve (5) and the outlet port (18) which is connected to the patient. The FIG. 2 also shows the fluidic pathway (17) which enters by the inlet valve (2), flows through the pumping chamber (11) then the outlet valve (5) and exits by the outlet port (18).

For the micro-pump such as described above, the tightness of the valves prevents therefore the direct communication between the drug reservoir and the patient because even during actuation there is at least one valve normally close in the fluidic pathway.

Since said inlet valve (2) is made of hard materials, the presence of a particle onto its valve seat induces a permanent gap that can lead to free flow and back flow. A free flow occurs typically in case of pressurization of the reservoir, the small gap of the valve (inlet and/or outlet valve (2, 5)) due to a particle making possible a flow between the reservoir and the patient. Thus, a free flow corresponds to a case of over infusion. A back flow is typically observed during the actuation of the pump without specific pressure conditions. If a particle is present onto the valve seat of the inlet valve, the pressurization of the liquid of the pumping chamber during the infusion phase of the pumping cycle induces a flow from the pumping chamber towards the reservoir. If a particle is present onto the valve seat of the outlet valve, the pressurization of the liquid of the pumping chamber during the filling phase of the pumping cycle induces a flow from the patient towards the pumping chamber. Thus, a back flow takes place in the wrong direction and induces therefore an underinfusion. In one embodiment, the presence of particles onto a valve seat induces a back-flow that affects the pump accuracy and the presence of particles onto both valves associated with a gradient of pressure between the inlet and the outlet induces a free flow.

Several types of valve are described by diverse patents, for example: US 2003/0071235, EP 1 283 957, U.S. Pat. No. 5,535,937, WO 91/01464 or U.S. Pat. No. 6,334,761. The tightness of these valves is the most important objective. All of them are designed to minimize the leak but none is able to insure the tightness if one or more particle should be deposited onto the valve or valve seat.

Because a flow can potentially transport particles below the valve seats, there is a risk during the functioning of the pump to get a back flow and eventually a free flow if several failures occur at the same time.

For an external pump, since the number of particles is very small thanks to a production in clean room, the accuracy of the pump could be ensured by estimating in real time the leak rate of the valves. The leak rate is estimated by analysing the signal of the detector located within the pumping chamber. In case of underdelivery due to a back flow, an alarm is triggered and the patient is invited to replace its pump. For implantable application this solution is obviously not allowed. A reservoir overpressure inducing a free flow could definitively be prevented by design of the reservoir. But the potential occurrence of a back flow inducing underinfusion, even if the probability is small, is not acceptable. Thus, valves having a better tolerance to particles should be used for implantable applications.

GENERAL DESCRIPTION OF THE INVENTION

The aim of the present invention is to propose a new valve design that overcomes the above-mentioned drawbacks. Said new valve may be used in a micro-pump (implantable or not) as described above, or in any other pump types or devices using at least one valve.

The present application claims the benefit of the priority of EP 13158177.9 filed on Mar. 7, 2014 in the name of DEBIOTECH SA, the entire disclosure of which is incorporated herein by reference.

The invention is set forth and characterized in the independent claim, while the dependent claims describe other characteristics of the invention.

To explain this invention, the present document describes the use of such a valve in a micro-pump but the invention is not limited to be used with a micro-pump. Where said micro-pump comprises at least one inlet and one outlet valves, a pumping chamber, a reservoir connected to said inlet valve and a fluidic line between said outlet valve and the delivery location in the patient's body. Said pumping chamber further comprises a pressure sensor and a pumping membrane. Said pumping membrane is linked to an actuator in such way that the connector is able to change the volume of the pumping chamber. In such micro-pump, the inlet and/or outlet valves may be a valve such describe by the present document. Thus, said valve comprises a valve body element and a valve seat element with respective first and second surfaces, and said valve elements are placed opposite each other. One of said valve element comprises a rigid and a flexible part. Said first and second surfaces are designed to tightly close the valve even if one or more particles are present between the valve elements. Said valve is able to insure the tightness when the particle has a height smaller than a predefined value.

In general, the present invention describes a valve for controlling the passage of a microfluidic system. Said valve comprises a first valve element and a second valve element with respective first and second surfaces which are placed opposite to each other and are designed to enter in contact in such a way as to control a fluid flow through said passage.

Advantageously, said first valve element comprises a planar component which is composed of a rigid part and a flexible part. Said planar component is not in contact with the second valve element when the valve is open. The first surface is composed of the surface of rigid part and the surface of the flexible part Preferably, the second surface is adapted to be in contact with said rigid part and said flexible part when the valve is closed. Preferably, the rigid part and the flexible part are made from a same material.

In one embodiment, said second valve element and said planar component being made from hard material such as (but not limited) silicon.

In one embodiment, said first valve element further comprises a support which is fixed to the planar component. In one embodiment, said rigid part is constituted by stacking of said support and said planar component.

The planar component may be made in one piece. The flexible part may extend in a parallel plan of the rigid part. The flexible part may be designed to bend in a direction perpendicular to a plan of the surface of rigid part.

The present invention may be also based on the following premise: the design of a valve seat element for microfluidic pumps is a compromise between the probability to get a particle onto the valve seat (therefore having a potential back-flow) and the effect of this particle on the value of the back-flow. A large valve seat increases the probability to trap a particle and also decreases the potential value of the back-flow, because the fluidic resistance of the valve (even having a particle onto its valve seat) remains important. And conversely, using a very thin valve seat, the risk to trap a particle is very low but if it happens the back-flow is dramatic. Thus, in one embodiment, the present invention may combine the two approaches: a large valve seat element and a thin valve seat element. The design with the flexible and rigid parts may be more efficient with a valve comprising a valve seat with two distinct parts. For this example, the valve seat element corresponds to the second valve element, but in other embodiment, said second valve element may be the valve body element.

Said second valve element may comprise two parts:
the first part is located opposite said rigid part and has height h1 and a width w1;
the second part is located opposite said flexible means and has height h2 and a width w2.

In one embodiment, said two parts of the second valve element form one single element. In other embodiment, said two parts of the second valve element are two distinct parts separated by a space. For both embodiments, said height h2 may be equal to or higher than said height h1 and/or, the width w2 may be equal to or smaller than the width w1.

Thus, the main goal of this invention is to ensure the tightness of the valve even if one or more particle is present between the valve body element and the valve seat element. Generally, the tightness of valves is ensured by a soft material like rubber but the micromachining technology does not permit to use this type of material. In this invention, the valve may be made from hard material while ensuring a very good tightness even in case of presence of a particle. Thus, these new design substantially improves the tightness of the valve when a particle is present between said valve body element and said valve seat element.

LIST OF FIGURES

Figure 3A:
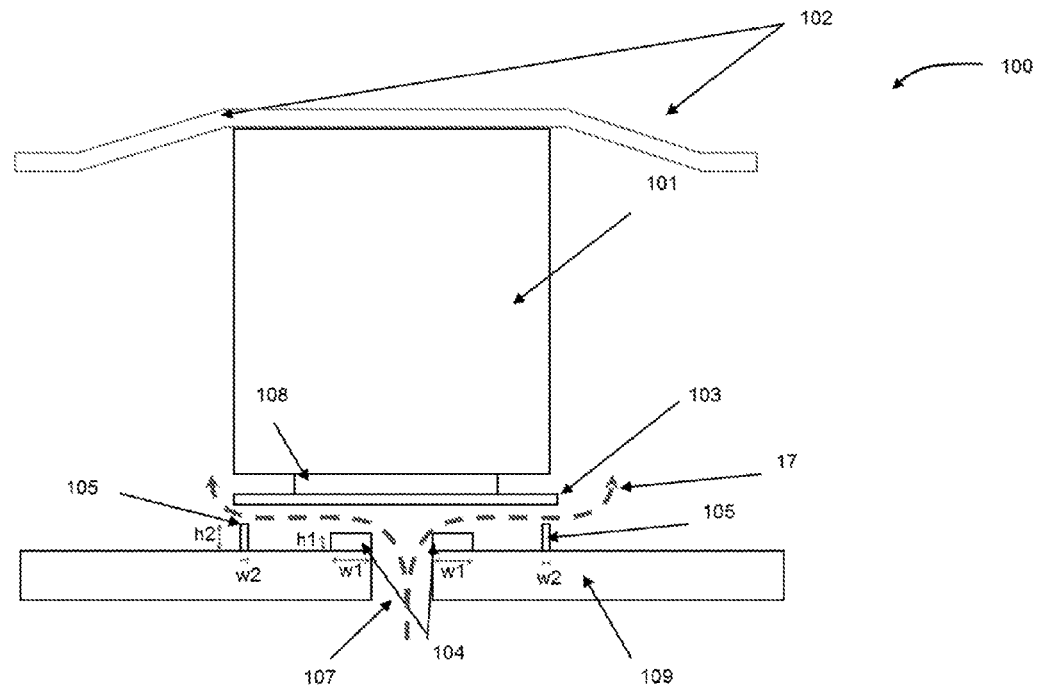
Figure 3B:
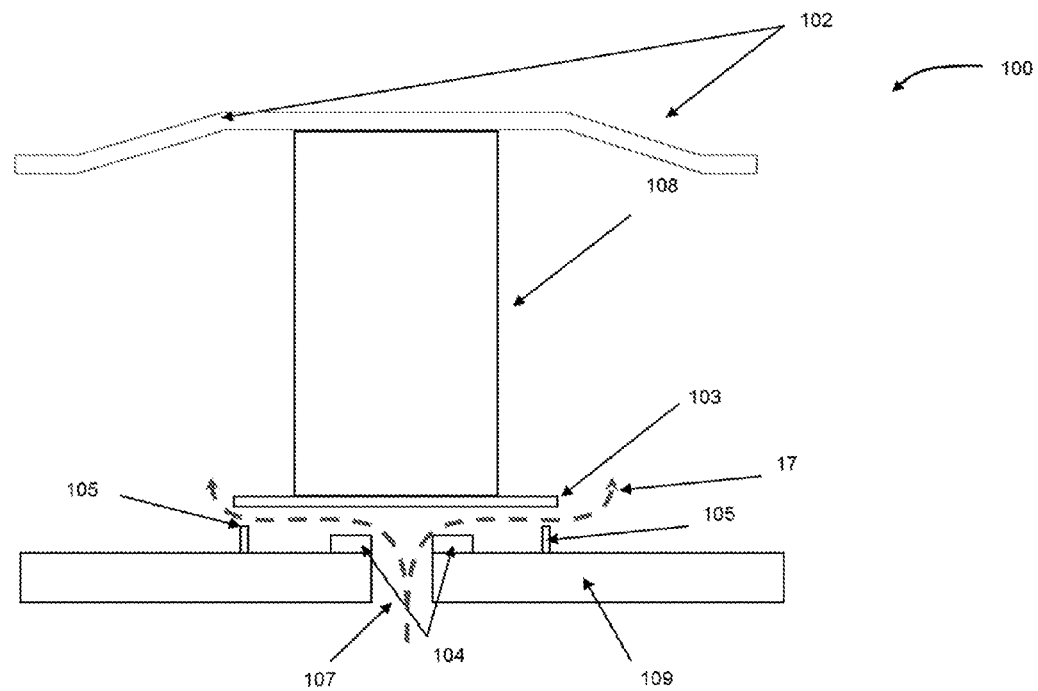
Figure 3C:
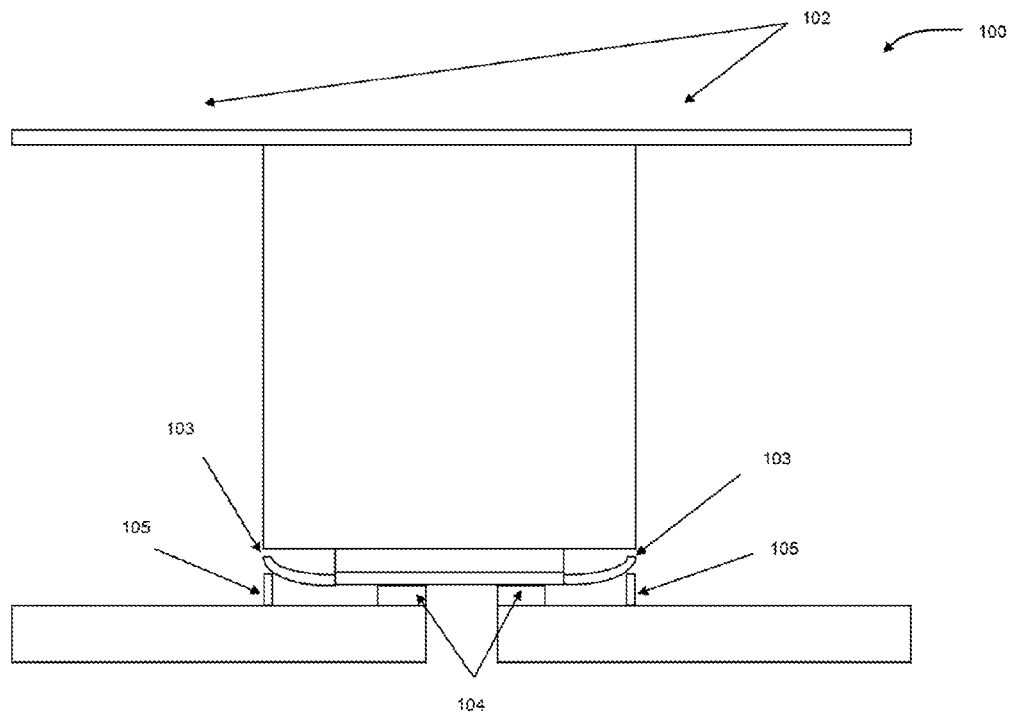
Figure 3D:
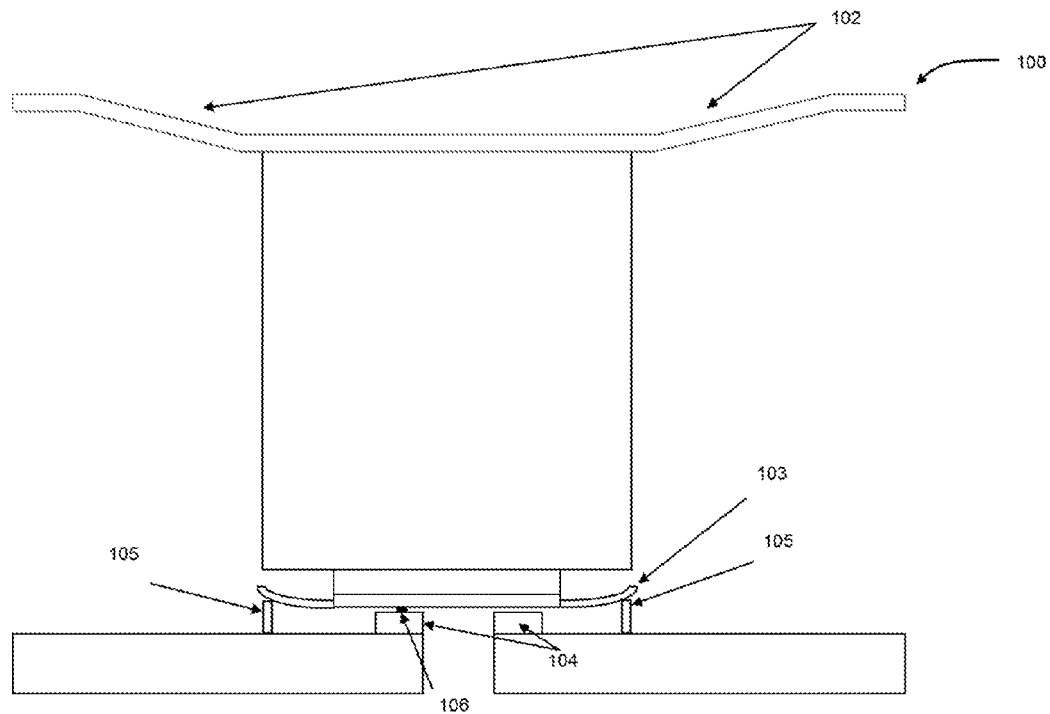
Figure 3E:
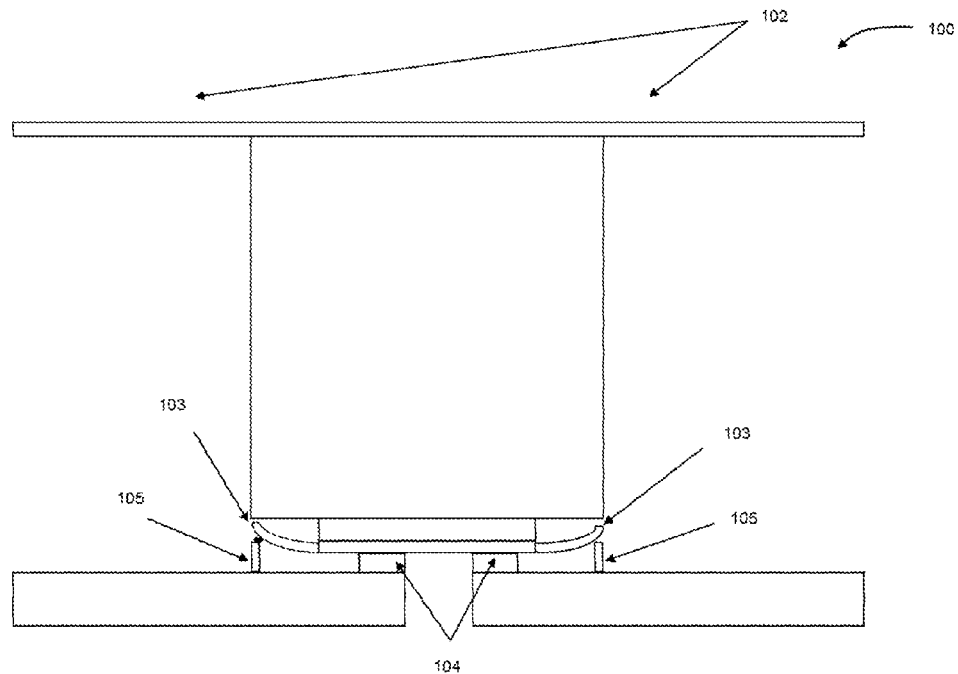
Figure 4:
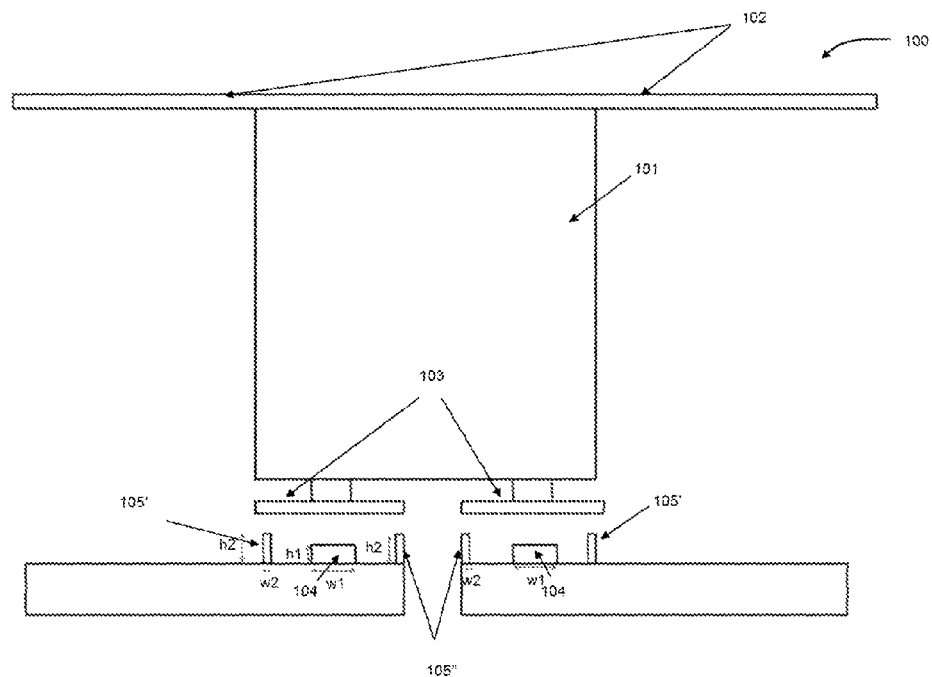
Figure 5A:
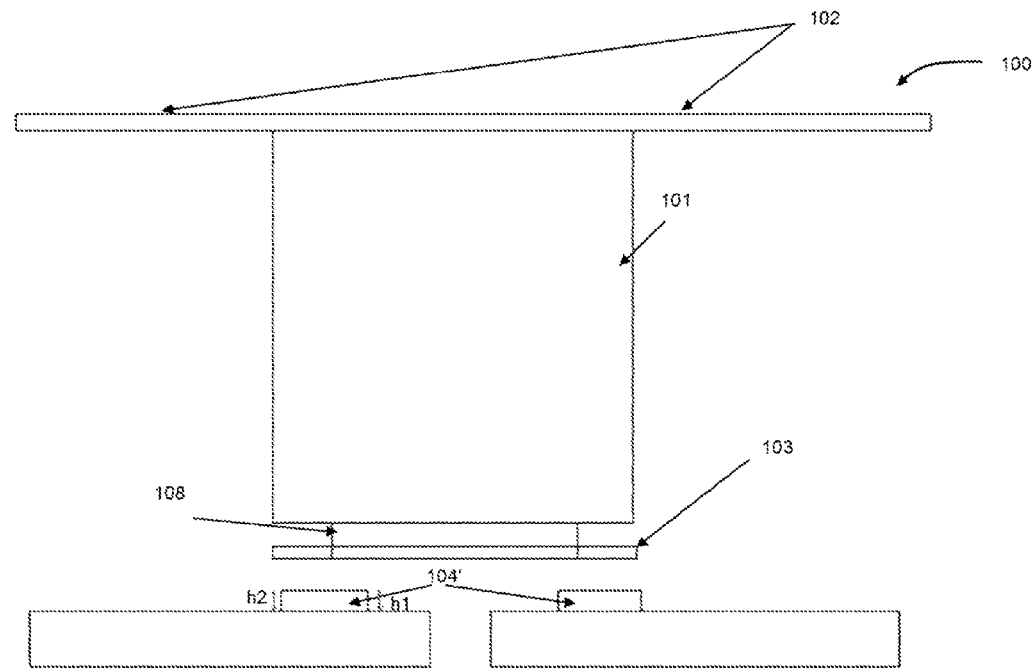
Figure 5B:
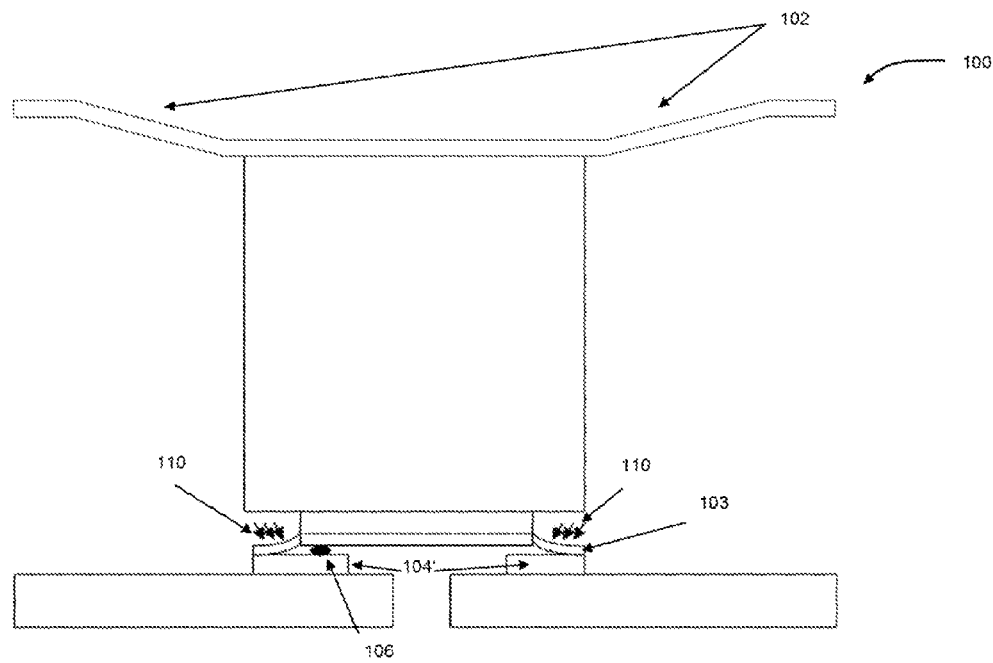
Figure 5C:
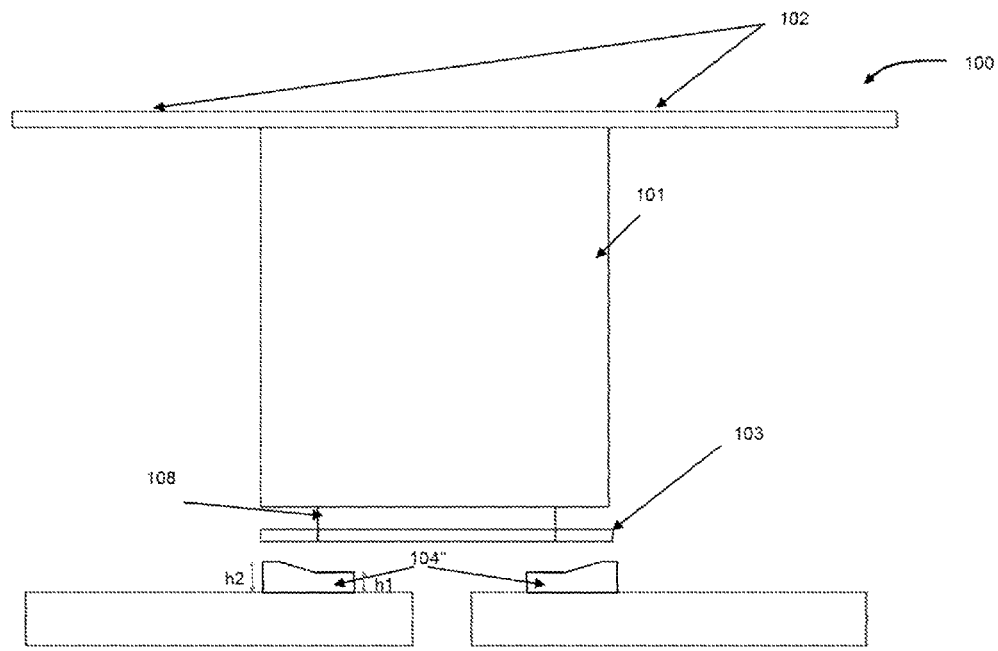
Figure 6:
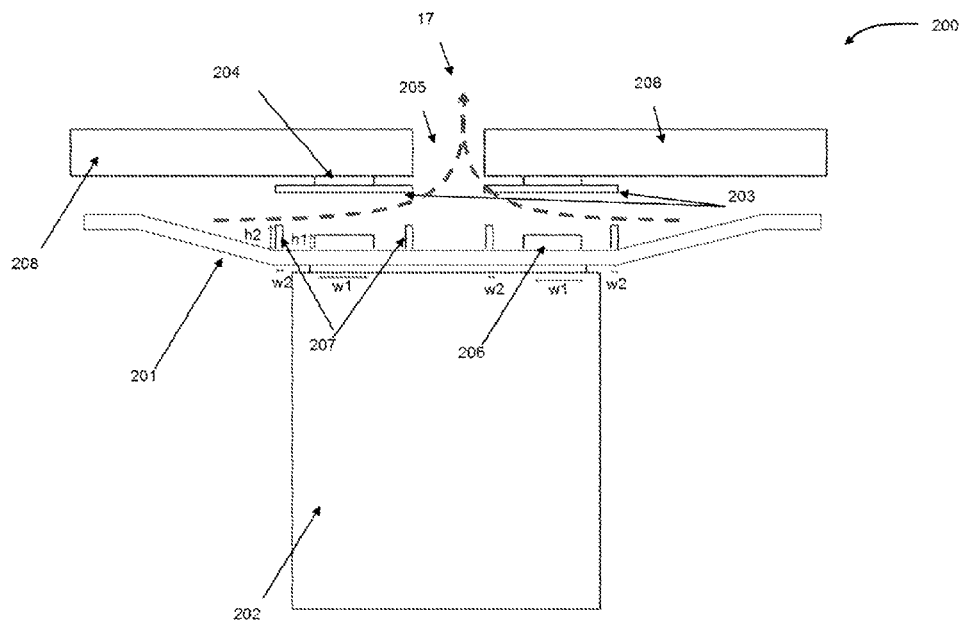
Figure 7:
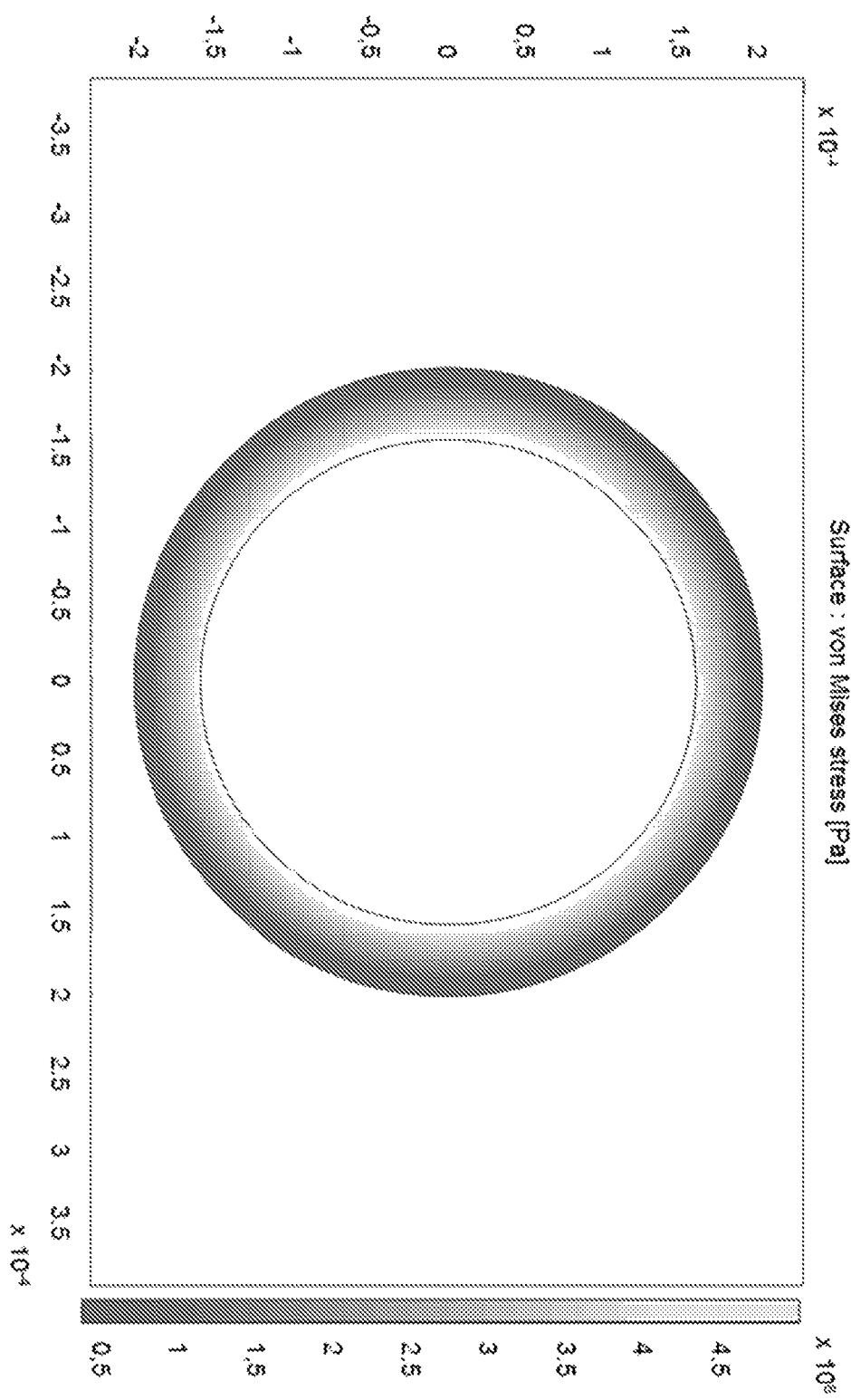

The invention is discussed below in a more detailed way with examples illustrated by the following figures:

FIG. 1 shows a cross-section of the MEMS micro-pump
FIG. 2 illustrates a cross-section of the MEMS micro-pump including two detectors and showing the fluidic pathway
FIG. 3a shows a valve in open position
FIG. 3b shows a valve in open position without spacer
FIG. 3c shows a valve in closed position without particle on the valve seat
FIGS. 3d and 3e show a valve in closed position with particle on the valve seat
FIG. 4 shows a valve in open position having two flexible rings
FIGS. 5a and 5c show a valve in open position having one flexible ring and a single valve seat
FIG. 5b shows a valve having one flexible ring and a single valve seat in closed position, a particle being present on the valve seat
FIG. 6 shows another configuration of a valve
FIG. 7 shows a simulation of a flexed of the planar component

LIST OF ELEMENTS 1 micro-pump or pump
2 inlet valve
3 pumping membrane
4 inner detector
5 outlet valve
6 mesa
7 channel
8 base plate
9 second plate
10 glass layer
11 pumping chamber
12 cover
13 outer detector
14 anti-bonding layer
15 anti-bonding layer
17 fluidic pathway
18 outlet port
100 valve
101 pillar
102 flexible arms
103 flexible ring
104 first part of the valve seat
104' valve seat
104" valve seat
105 second part of the valve seat
105' second part of the valve seat
105" second part of the valve seat
106 particle
107 inlet hole
108 spacer
109 base plate
110 pressure
200 valve
201 membrane
202 pillar
203 flexible ring
204 spacer
205 outlet hole
206 first valve seat
207 second valve seat
208 top substrate

DETAILED DESCRIPTION OF THE INVENTION

In the following detailed description, reference is made to the accompanying drawings that form a part hereof, and in which are shown by way of illustration several embodiments of devices, systems and methods. It is to be understood that other embodiments are contemplated and may be made without departing from the scope or spirit of the present disclosure. The following detailed description, therefore, is not to be taken in a limiting sense.

As used in this specification and the appended claims, the term "or" is generally employed in its sense including "and/or" unless the content clearly dictates otherwise.

As used in this specification and the appended claims, any direction referred to herein, such as "top", "bottom", "left", "right", "upper", "lower", and other directions or orientations are described herein for clarity in reference to the figures and are not intended to be limiting of an actual device or system. Devices and systems described herein may be used in a number of directions and orientations.

In this document, the term "planar component" is used for clarity in reference to the figures and is not intended to be limiting of an actual device or system. Thus, this planar component may be more or less curved and/or may take other particular forms. For example, the planar element may be concave, convex or wave-shaped or other . . . .

In the present document, the term "hard material" means a material which is characterized by a high resistance to deformation, indentation, or penetration by means such as abrasion, drilling, impact, scratching, and/or wear, measured by hardness tests such as Brinell, Knoop, Rockwell, or Vickers. In one embodiment of this invention, the hard material is silicon which is characterized by a high level of hardness. The silicon has a Knoop hardness of about 1100 KHN. Other material should be considered as hard, for example the material which has a Knoop hardness of at least 300 KHN, 500 KHN or 800 KHN. The term "flexible part" means the part which is capable of being flexed and conversely, the term "rigid part" means the part which cannot be flexed. Thus, hard and flexible are not opposite terms and a material may be hard and flexible or hard and rigid.

The valve described by this document may be contained in a MEMS (Micro-Electro-Mechanical System) such as a micro-pumps disclosed for example by the patent publications US 2006/027523 and WO 2010/046728 A1.

The FIG. 1 illustrates such a MEMS micro-pump (1) comprising a highly miniaturized and reciprocating membrane pumping mechanism. Said micro-pump (1) may be made from silicon or silicon and glass, using technologies referred to as MEMS. Said micro-pump (1) contains an inlet control member, at least one valve, a pumping membrane (3) and a functional inner detector (4) which allows detection of various failures in the system. In one embodiment, said micro-pump (1) comprises two distinct valves: an inlet valve (2) and an outlet valve (5). The principle of such micro-pumps is disclosed by the U.S. Pat. No. 5,759,014, the content of which is incorporated by reference in the present application.

Said micro-pump (1) is made with the stack of a glass layer as base plate (8), a silicon layer as second plate (9), secured to the base plate (8), and a second glass layer (10) as a top plate, secured to the silicon plate (9), thereby defining a pumping chamber (11) having a volume.

An actuator (not represented here) linked to the mesa (6) allows the controlled displacement of the pumping membrane (3) between the top plate (10) and the base plate (8), and more specifically on the anti-bonding layers (14) and (15) (which may be an array of tiny square pads on FIGS. 1 and 2) of said top plate (10) and said base plate (8). Theses top plate (10) and base plate (8), having or not anti-bonding layers, may be respectively a bottom and a top mechanical stops for the pumping membrane (3). A channel (7) is also present in order to connect the outlet control member, the outlet valve (5) to the outer detector not represented here and finally to the outlet port placed on the opposite side of the pump.

The FIG. 2 illustrates another cross-section showing a MEMS micro-pump (1) which includes a cover (12) onto the channel (7), an outer detector (13) and a fluidic channel (17) between the outer detector (13) and the outlet port (18). The FIG. 2 also shows the fluidic pathway which enters by the inlet valve (2), flows through the pumping chamber (11) then the outlet valve (5) and exits by the outlet port (18).

The pressure inside the pumping chamber (11) varies during a pumping cycle depending on numerous factors, such as the actuation rate, the pressure at the inlet and the outlet, the potential presence of a bubble volume, the valve characteristics and their leak rates.

During the filling, the mesa pulls the membrane against the bottom mechanical stop, the outlet valve is in a closed position and the inlet valve is in an open position; inducing an under pressure in the pumping chamber. Thus, a fluid contained in a reservoir flows from said reservoir to said pumping chamber.

During the infusion, the actuator pushes the mesa and therefore the pumping membrane against the upper mechanical stop. The outlet valve is in an open position and the inlet valve is in a closed position. Inducing an overpressure, said fluid contained in said pumping chamber flows from said pumping chamber to outlet port.

Thus, the device is called a "push-pull" device because the membrane should be pushed to reach the upper stop and pulled to reach the lower stop, its rest position being located more or less at the middle of the stroke, i.e. at the same distance of the two mechanical stops.

In one embodiment, said valve is a passive valve. Therefore, during the filing, the under pressure in the pumping chamber opens the inlet valve and closes the outlet valve. And during the infusion, the overpressure in the pumping chamber closes the inlet valve and opens the outlet.

In one embodiment, one or both valve has a pretension and the rest position is the closed position in such a manner as the valve opens when a pressure threshold is reached. Thus, the inlet and/or outlet valve is normally closed.

In the present invention, the valve comprises two distinct valve elements placed opposite to each other: a valve body element and a valve seat element. Each said elements contains a base which may be linked to the base plate (8) or to the top plate (10) of the microfluidic system and an end (so called surface) which comes in contact to said other element. For the present invention, said ends are designed to tightly close the microfluidic system when the valve is in closed position in such a way that even if a particle is located between said ends, the valve can close said microfluidic system.

In a preferred embodiment, the valve comprises:
  A first valve element (103, 108, 203, 204) and a second valve element (104, 104', 105, 105', 104'', 206, 207) with respective first and second surfaces which are placed opposite to each other and are designed to come in contact in such a way as to control a fluid flow through said passage;
  The first valve element comprises a planar component (103, 203) which is composed of a rigid part and a flexible part which are not in contact with the second valve element when the valve is open;
  The first surface is composed of the surface of rigid part and the surface of the flexible part;

The second surface being adapted to be in contact with said rigid part and said flexible part when the valve is closed.

The rigid part and the flexible part may be made from a same material

Said second valve element and said planar component may be made from hard material such as silicon. The hardness factor of the flexible part may be substantially equal to the hardness factor of the rigid part according to the Knoop hardness scale. The hardness factor of the planar component may be substantially equal to the hardness factor of the second valve element according to the Knoop hardness scale.

In one embodiment, said first valve element further comprises a support (108, 204) which is fixed to the planar component (103, 203). In one embodiment, said rigid part is constituted by stacking of said support (108, 204) and said planar component (103, 203).

In one embodiment, the first valve element comprises a planar component (103, 203) and a support (108, 204); one face of said planar component (103, 203) comprising said first contact surface, and a dedicated portion of the other face being fixed to said support (108, 204), providing thereby the planar component (103, 203) with a rigid part and a flexible part, the rigid part including said dedicated portion;

If a particle is located between the second contact surface and the rigid part (respectively the flexible part), the valve can tightly close thanks to the flexible part (respectively the rigid part) which is in contact with the second contact surface.

Thus, even if the valve is made from hard material, the flexible part and the rigid part permit to have a double insurance against the risk of leak.

In one embodiment, the height (h2) of the second valve element part located opposite said flexible part is equal to or higher than the height (h1) of said second valve element part located opposite said rigid part.

In one embodiment, the first valve element may be the valve body element (respectively the valve seat element) and the second valve element may be the valve body element (respectively the valve body element).

In one embodiment shown in FIG. 3a, the inlet valve (100) comprises a valve body element and a valve seat element. Said valve body comprises, at its base, flexible arms (102) which permit said valve body element to be movable. Said valve body element further comprises a pillar (101), a spacer (108) and a planar component (103). The FIG. 3b shows the same inlet valve but the spacer (108) and the pillar (101) are the same element called spacer (108). It is not essential to distinct the spacer (108) and the pillar (101) but it is essential that the planar component extends around the spacer (108) in such a way that the valve body element comprises a rigid part and a flexible part. Said rigid part is the part containing said spacer and said planar component and said flexible part is the part containing only said planar component.

Said valve seat element comprises a first part (104) located opposite said rigid part and a second part (105) located opposite said flexible part. Said first part (104) has a height h1 and a width w1; and said second part (105) has a height h2 and a width w2. The base plate (109) has an inlet hole (107), the first part (104) and the second part (105) both may have anti bonding properties on their contact surfaces.

In FIGS. 3 and 4, h2 is higher than h1 and w2 is smaller than w1. But, h2 may be equal to h1 and/or w2 may be equal to w1.

The valve shown in FIG. 3a is in open position and comprises a planar component which may have a substantially flat face at its end but the invention may comprise a planar component with several forms, for example concave, convex, wave-shaped or other . . . .

The valve shown in FIGS. 3c, 3d and 3e is in closed position. Considering the inlet valve, during the infusion phase, the pressure pushes said flexible part onto the second part (105), increasing the closure of the valve and increasing the residual fluidic resistance of the valve in closed position.

In absence of particle contamination, the valve in closed position is shown in FIG. 3c, both part of the valve seat (104, 105) are in contact with the bottom of the pillar. If a particle is present on the valve seat element (black dot in the FIGS. 3d and 3e), the tightness of the valve is only ensured by the contact between the flexible part (in FIG. 3d) of the planar component (103) and the second part (105) of the valve seat. Conversely, in FIG. 3e, the tightness of the valve is only ensured by the contact between the rigid part of the planar component (103) and the first part (104) of the valve seat.

In one embodiment as shown in FIG. 4, the valve comprises several second parts (105', 105") and several flexible parts.

In another embodiment as shown in FIGS. 5a, 5b and 5c, the valve may comprises only one valve seat element (104', 104") designed to be in contact with said flexible part and said rigid part when the valve is in closed position. The tightness is ensured by the deflection of the flexible part of the planar component (103) against said valve seat due to the pressure, preventing the back-flow.

If a particle is present on said valve seat (104', 104") (shown in FIG. 5b), during the infusion phase of the pumping cycle, a positive pressure is generated in the pumping chamber and therefore around the inlet valve pillar (101). The small gap between the valve seat element and the end of the valve body element makes possible a flow rate in the reverse direction to the normal infusion (so called back-flow). The gradient of pressure below the flexible part of the planar component (103) due to this back-flow induces a deflection said flexible part and therefore a closing of the valve. During the filling of the pump, the negative pressure generated in the pumping chamber lifts the flexible part and prevents any stiction between the valve seat (104', 104") and the end of the valve body.

The restoring force of the flexible part onto the pillar when the valve is in closed position is added to the restoring force of the flexible arms (102) for the estimation of the valve pretension.

In one embodiment, said planar component is made of silicon. For this example shown in FIG. 7, the thickness (h3) of the planar component is 2 μm and its radius (R1) is equal to 200 μm; the radius (R2) of the rigid part being equal to 160 μm and the wide (D1) of the flexible part being equal to 40 μm. With this configuration, the simulation shows that the flexible part can flex up to 2 μm at its external edge and the maximum Von Mises stress is limited to 500 MPa.

In an embodiment, the gap between the end of the pillar (101) and the flexible part of the planar component (103) may be equal to the thickness of the spacer (108). Said gap must be limited due to the risk of breaking of the flexible part during the functioning of the pump or due to meniscus effect.

Another embodiment of valve (200) is shown in FIG. 6. This configuration corresponds to an outlet valve (5) as shown in FIGS. 1 and 2. The pillar (202) is not in contact with the fluid. A flexible membrane (201) permits the pillar (202) to be movable, so that said valve (200) can be opened or closed. Said second valve element is the valve body which comprises two distinct parts: a first part (206) and a second part (207) having ideally a height h2 slightly larger than the height h1 of the first part (206).

The top plate (208) has a hole (205), the fluid flows from the pumping chamber and through this hole (205) of the outlet valve (200). The top plate (208) comprises an anti-bonding layer made of a spacer (204) and a planar component (203) having flexible parts. Said flexible parts are designed to be in contact with said second part (207) even if a particle—having a diameter smaller than h2−h1—is present onto said first part (206). This design prevents any back-flow from the outlet towards the pumping chamber during the filling phase of the pumping cycle. The outlet valve may comprise one or several flexible parts as for the inlet valve.

The invention claimed is:

1. A valve for controlling a passage of a fluid in a microfluidic system having a leak tolerance to a presence of particles, the valve comprising:
   a fluid passage;
   a first valve element having a first surface, the first surface formed by a rigid part and a flexible part, the rigid part and the flexible part made from a same material;
   a second valve element having a second surface; and
   a flexible arm urging the first valve element towards the second valve element for closing the fluid passage in a rest position,
   wherein the first and second valve element are arranged opposite to each other and configured to contact each other to control a fluid flow through the fluid passage,
   wherein the rigid part and the flexible part of the first valve element are not in contact with the second valve element when the valve is open,
   wherein the rigid part and the flexible part of the first valve element are in contact with the second valve element when the valve is closed and in the rest position, and
   wherein the first surface of the first valve element is configured such the rigid part forms a sealed connection with the second surface when a particle prevents sealing of the flexible part.

2. The valve according to claim 1, wherein the flexible part is configured to bend in a direction perpendicular to the first surface formed by the rigid part.

3. The valve according to claim 1, wherein at least one of the first surface of the first valve element and the second surface of the second valve element has a Knoop hardness of at least 300 KHN.

4. The valve according to claim 1, wherein a hardness factor of the first surface of the first valve element and a hardness factor of the second surface of the second valve element is substantially equal.

5. The valve according to the claim 1, wherein a hardness factor of the first surface of the first valve element is substantially equal to the hardness factor of the second valve element according to a Knoop hardness scale.

6. The valve according to claim 1, wherein the first surface is substantially flat.

7. The valve according to claim 1, wherein the flexible part can flex up to 2 μm.

8. The valve according to claim 1, wherein the first valve element forms a valve body element and the second valve element forms a valve seat element, or the first valve element forms a valve seat element and the second valve element forms a valve body element.

9. The valve according to claim 8, wherein the valve body element further comprises a pillar.

10. The valve according to the claim 1, wherein the first valve element further includes a support, and the first surface of the first valve part including the rigid part and the flexible part is formed as a planar component.

11. The valve according to claim 10, wherein the planar component and the support form a stack, the rigid part of the first valve part formed along a width of the support.

12. The valve according to claim 10, wherein the planar component is made from a material selected from the group including at least one of silicon, borosilicate, metal, silicon nitride, and silicon oxide.

13. The valve according to claim 10, wherein the planar component has a thickness substantially smaller than a width.

14. The valve according to claim 1, wherein the second valve element includes
   a first part located opposite the rigid part and having a height h1 and a width w1; and
   a second part located opposite the flexible part and having a height h2 and a width w2.

15. The valve according to claim 14, wherein the height h2 is equal to or higher than the height h1.

16. The valve according to claim 14, wherein the width w2 is equal to or smaller than the width w1.

17. The valve according to claim 14, wherein a space is arranged between the first part and the second parts of the second valve element.

18. A valve for controlling a passage of a fluid having a leak tolerance to a presence of particles, the valve comprising:
   a first valve element having a planar element, the planar element including a rigid part and a flexible part, the rigid part and the flexible part made from a same material;
   a second valve element having a contact surface, the second valve element arranged opposite to the first valve element, one portion of the contact surface configured to engage and disengage with the flexible part, and another portion of the contact surface configured to engage and disengage with the rigid part;
   a fluid passage that passes between both the first valve element and the second valve element; and
   a flexible arm urging the first valve element towards the second valve element for closing the fluid passage in a rest position,
   wherein both the rigid part and the flexible part of the first valve element are not engaging with the second valve element when the valve is open,
   wherein both the rigid part and the flexible part of the first valve element are engaging with the second surface of the second valve element when the valve is closed in the rest position, and
   wherein the first surface of the first valve element is configured such the rigid part forms a sealed connection with the second surface when a particle prevents sealing of the flexible part.

19. The valve according to claim 18, wherein a space between the rigid part of the first valve element and the portion of the contact surface of the second valve element forms a first fluid passage, and a space between the flexible part of the first valve element and the another portion of the contact surface of the second valve element forms a second fluid passage, and
   wherein the first and the second fluid passages arranged in series with a fluid passage of the valve.

20. The valve according to claim 18, wherein the flexible part is configured to bend in a direction that is perpendicular to a surface formed by the planar element when the flexible part is engaging with the second surface.

21. The valve according to claim 18, wherein the flexible part is arranged at an outer circumference of the planar element, the outer circumference not being in contact with any valve element.

22. The valve according to claim 18, wherein the flexible part can flex up to 2 μm.

* * * * *